United States Patent
MacDonald et al.

(10) Patent No.: US 9,393,510 B2
(45) Date of Patent: Jul. 19, 2016

(54) LOUVER DEVICE FOR REMOVING MOISTURE AND DUST

(71) Applicant: GRG, LLC, Stuart, FL (US)

(72) Inventors: George MacDonald, Jupiter, FL (US);
Gregory Newton, Jupiter, FL (US);
Richard Clemence, Southbridge, MA (US)

(73) Assignee: GRG, LLC, Stuart, FL (US)

( * ) Notice: Subject to any disclaimer, the term of this patent is extended or adjusted under 35 U.S.C. 154(b) by 0 days.

(21) Appl. No.: 14/397,008

(22) PCT Filed: Apr. 25, 2013

(86) PCT No.: PCT/US2013/038140
§ 371 (c)(1),
(2) Date: Oct. 24, 2014

(87) PCT Pub. No.: WO2013/163379
PCT Pub. Date: Oct. 31, 2013

(65) Prior Publication Data
US 2015/0135661 A1 May 21, 2015

Related U.S. Application Data

(60) Provisional application No. 61/639,562, filed on Apr. 27, 2012.

(51) Int. Cl.
*B01D 45/00* (2006.01)
*B01D 45/08* (2006.01)
(Continued)

(52) U.S. Cl.
CPC ............... *B01D 45/08* (2013.01); *B01D 45/06* (2013.01); *B01D 45/12* (2013.01); *B01D 50/002* (2013.01); *F24F 13/08* (2013.01); *F24F 13/082* (2013.01); *A47L 9/1683* (2013.01)

(58) Field of Classification Search
CPC ...... B01D 45/08; B01D 50/002; B01D 45/12; B01D 45/06; A47L 9/1683
USPC ............................... 55/440–446; 95/267–268
See application file for complete search history.

(56) References Cited

U.S. PATENT DOCUMENTS 3,916,774 A 11/1975 Labrec
3,973,590 A 8/1976 Logsdon
(Continued)

FOREIGN PATENT DOCUMENTS

WO WO 01/00299 A1 1/2001
WO WO 2008/157699 12/2008

OTHER PUBLICATIONS

Pamadi, Bandu N., Performance, Stability, Dynamics and Control of Airplanes, American Institute of Aeronautics and Astronautics, Inc., Reston, VA, 2nd Ed., 2004, pp. 12-15.
(Continued)

*Primary Examiner* — Dung H Bui
(74) *Attorney, Agent, or Firm* — D. Peter Hochberg; Sean F. Mellino

(57) ABSTRACT

A moisture and dust removing louver pack is composed of a set of pivotable louvers which can pivot between open and closed positions in an air passageway, the louvers allowing air to pass through the passageway when in the open position and having moisture and dust removing structure for air to impinge upon to remove moisture and dust from the air passing through the passageway.

9 Claims, 17 Drawing Sheets

(51) Int. Cl.
*B01D 50/00* (2006.01)
*B01D 45/12* (2006.01)
*B01D 45/06* (2006.01)
*F24F 13/08* (2006.01)
*A47L 9/16* (2006.01)

(56) References Cited

U.S. PATENT DOCUMENTS

| | | |
|---|---|---|
| 4,430,101 A | 2/1984 | Sixsmith |
| 4,557,740 A | 12/1985 | Smith |
| 6,266,923 B1 | 7/2001 | Lee |
| 2004/0148899 A1 | 8/2004 | Pertile |
| 2009/0101014 A1* | 4/2009 | Baseotto ............... 95/272 |

OTHER PUBLICATIONS

Senson, Ben, et al., Air Foil Sections, Aerospace Engineering from the Ground Up, Cengage Learning, 2011, pp. 91, 92.

Von Mises, Richard, The Airplane Wing, Chapter VI, Theory of Flight, Courier Dover Publications, 1959, pp. 112-119.

* cited by examiner

LOUVER DEVICE FOR REMOVING MOISTURE AND DUST

BACKGROUND OF THE INVENTION

1. Field of the Invention

This invention relates to the substantial removal of moisture and dust from air flowing into a compartment, and to a louver device for opening and closing access of airflow to the compartment.

2. Description of the Prior Art

According to the prior art, devices for removing moisture, dust, dirt and other loose particles from airstreams to or from a compartment involve employing a separate filter unit to clean the airflow with a separate closure device to restrict the ingress and egress of the airflow to the compartment. Such devices have been used in a wide variety of situations, including shipboard, compartments for land vehicles, buildings having moist air flowing therethrough, different cabinets and enclosures, refrigeration compartments, air handlers used in ventilating systems, power stations, laboratories and the like. The use of separate filters adds expense to the elimination of moisture and dust and to opening and closing the ingress and egress of a compartment, and adds cost due to the apparatus relating to the filter.

A polluted solution, be it gas or liquid, may be purified by passing it through an impingement filter. The action of inducing the solution to change direction and the particles to adhere to the filter medium is the function of the filter medium. In many cases this filter medium is scientifically designed to contain apertures of specific size which will filter out the impurities in the solution. The gas or liquid, less impurities, is permitted free passage through the medium.

In known impingement mist separators, the separating louvers are typically supported in parallel fashion with respect to one another to define a plurality of openings through which the gas may pass. The separating louvers usually include a plurality of protrusions or hooks for trapping water droplets, which impinge on the separating louvers.

The series of protrusions or hooks define channels in which the liquid droplets and dust tend to stay when removed from the air or other gas. The object is to remove the liquid from the channels while preventing their re-entrainment into the gas flow.

When a liquid-containing gas flows through a mist eliminator of this general type, the inertia of the moving liquid droplets causes them to diverge from the direction of flow of the gas stream as the gas travels through a tortuous path and the liquid droplets impinge on the surface of the separating plates. The magnitude of the entraining forces which act to prevent the elimination of the liquid droplets from the gas stream depend on the gas velocity, the mass of the drop, the viscosity of the gas, and the geometric relations in the separating structure.

Louver apparatus presently available are fixed. Each louver is attached to some mounting plate or the like and is unable to close the air passageway where the louver apparatus is disposed. It would be advantageous in some instances to be able to close the passageway other than by incorporating an additional door or other closure device.

SUMMARY OF THE INVENTION

The present invention provides apparatus for removing moisture and dust from airflow. Since the inventive apparatus is used in environments where moisture includes dust contaminants, the terms "moisture and dust," "moisture and dust removing louver" and "moisture dust removing louver pack" are used herein.

A general object of the present invention is to provide an improved apparatus for removing moisture and dust from airflow.

Another object of the present invention is to remove moisture and dust from airflow through a compartment, such as an engine room used on ships.

Another object of the present invention is to provide an improved louver apparatus for removing moisture and dust from the ingress and egress of air flowing through the louver apparatus.

It is yet another object of the present invention to provide an improved apparatus for removing moisture and dust from airflow, which apparatus does not require a separate filter.

Another object of the present invention is to provide a louver apparatus for opening and closing the apparatus to enable or prevent the flow of air through the apparatus and, in addition, to provide the same louver apparatus for removing moisture and dust from the airflow.

Still an additional object of the present invention is to provide a louver pack for removing moisture and dust from air flowing through the louver pack when the respective louvers are in their open condition by reason of the shapes of the respective louver of the louver pack.

It is an additional object to provide a particularly effective pivoting system for pivoting louvers between open and closed positions.

It is still yet an additional object of the present invention to provide alternate louvers for use in a louver pack for treating air flowing through the louvers.

It is a more specific object of the present invention to provide apparatus for removing moisture and dust from engine compartment intake combustion air, while serving as a weather closure containment device for water vessels.

Another specific object of the invention is to remove moisture for airflow being controlled in a ventilation control system in water vessels, where the ventilation is controlled in accordance with the heat and/or pressure in a controlled space through the control of the airflow.

A general object of the present invention is to provide a set of louvers for removing moisture and dust from airflow which is economical to make and easy and functional in use.

These and other objects will be apparent from the description to follow and from the appended claims.

BRIEF DESCRIPTION OF THE DRAWINGS

The invention may take physical form in certain parts and arrangement of parts, the preferred embodiment of which will be described in detail in the specification and illustrated in the accompanying drawings which form a part hereof, and wherein.

DETAILED DESCRIPTION OF THE INVENTION

According to the preferred embodiment of the invention, a louver pack or louver assembly is composed of a set of generally identical louvers, having the same shape and length and arranged to pivot simultaneously in a parallel fashion. The louver pack is mounted between both a pair of louver-control arms and between a pair of hinge plates, and the respective louvers are rotated or pivoted between open and closed positions. The louvers pivot about respective fulcrums by means of movement caused by a louver control arm. Louver control arm hinge pins extend into respective receptacles near the leading end of each of the respective louvers for causing rotation or pivoting of the louvers, and respective hinge plate pins extend into fulcrum receptacles near an intermediate portion of the respective louvers about which the louvers rotate. The louver control arm moves back and forth in a direction parallel to the parallel imaginary planes of the pivotal axes of the respective louvers to open and close the louvers. The shape of the respective louvers causes moisture and dust to impinge on hooks protruding into the airflow path across the respective louvers to remove the moisture and dust from the air flowing through the louvers. There are a number of different louver constructions provided according to preferred embodiments of the invention. These louvers have various shapes similar to those of airfoils. Each of the embodiments described below enables air to flow across the respective louvers which are parts of respective sets of louvers which, due to the respective tortuous flow paths and the appropriately spaced hooks and channels, enables moisture and dust to be separated from the flowing air and to accumulate in—and flow from—the louvers.

Figure 1:
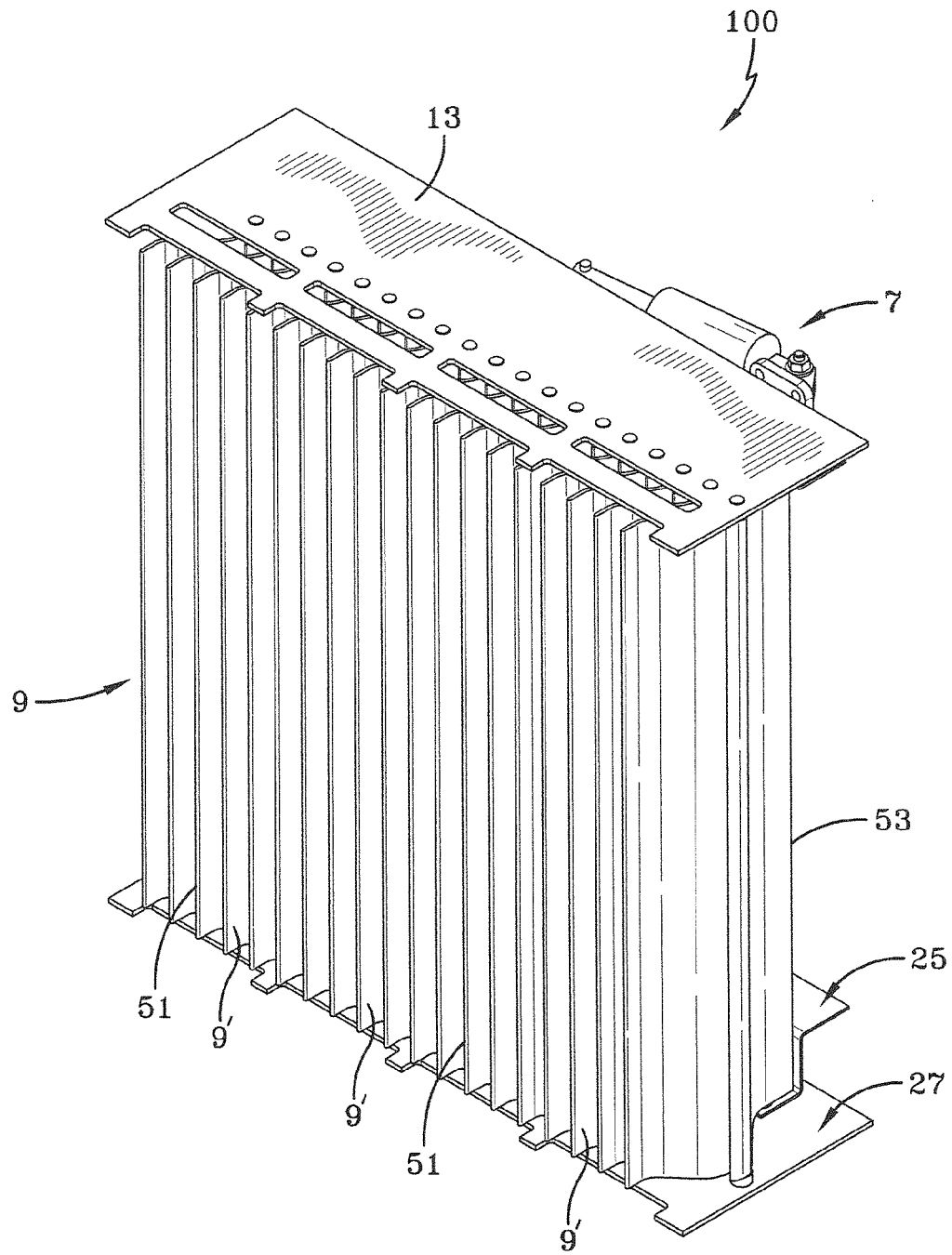
FIG. 1 is a perspective front view of a moisture and dust removing louver pack in an open position according to a preferred embodiment of the invention.

Turning first to FIG. 1, which is a perspective front view of a moisture and dust removing louver pack 100 according to the invention with the louvers in their open position, louver pack 100 is shown as including: a movable support mechanism is provided including a fulcrum support mechanism in the form of an upper hinge plate 13 and a lower hinge plate 27, an actuator assembly 7, and a set of moisture and dust removing louvers 9 composed of individual louvers 9'.

Figure 2:
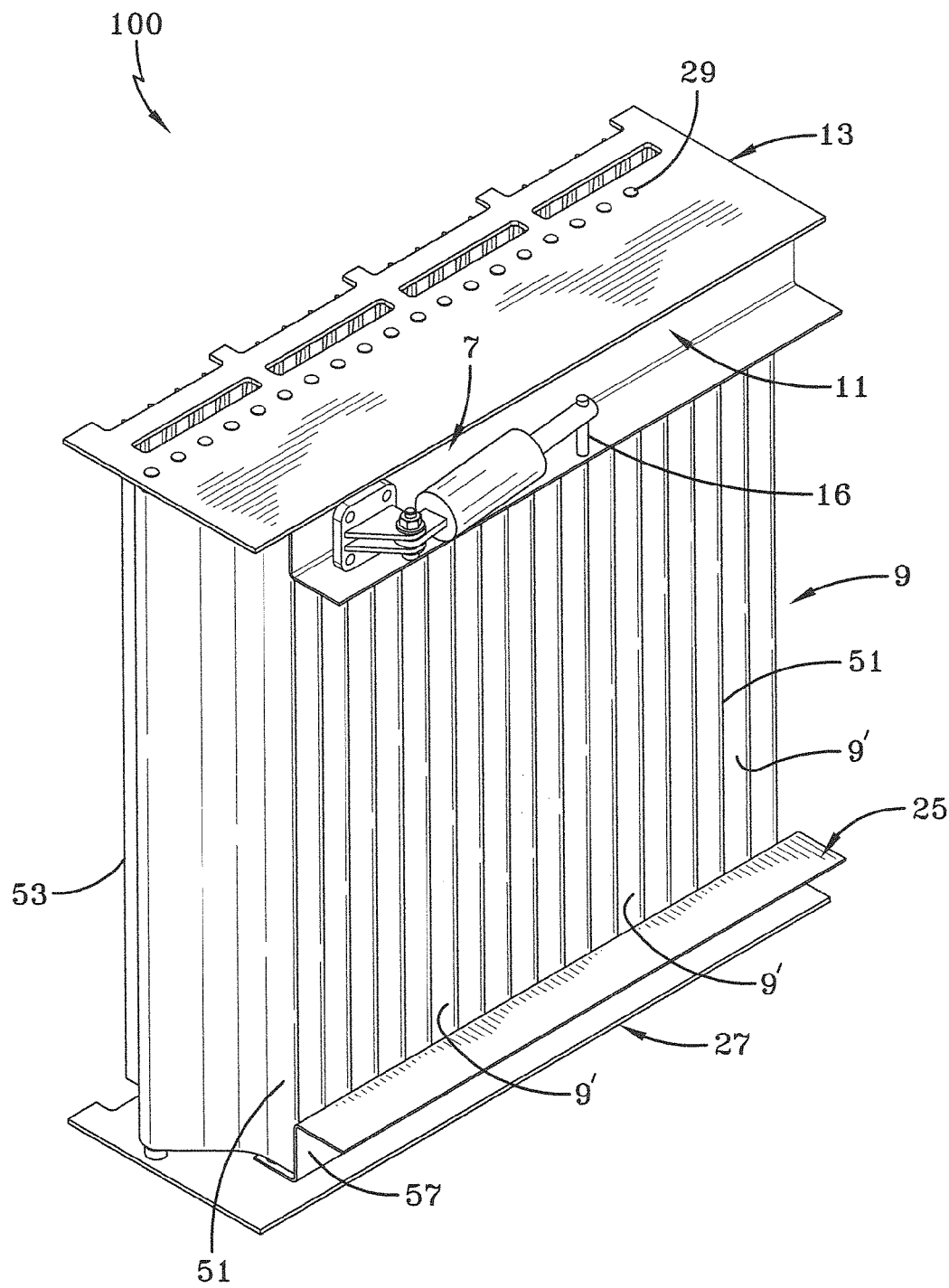
FIG. 2 is a perspective rear view of the moisture and dust removing louver pack shown in FIG. 1, in an open position.

The rear view of a moisture and dust removing louver pack 100 is shown in its open position in FIG. 2. Referring to both FIGS. 1 and 2, the preferred embodiment of the invention further comprises a movable support mechanism in the form of an upper control arm 11, and upper louver control arm pins depending from upper louver control arm 11. Actuator assembly 7 includes an actuator attachment pin 16.

Figure 3:
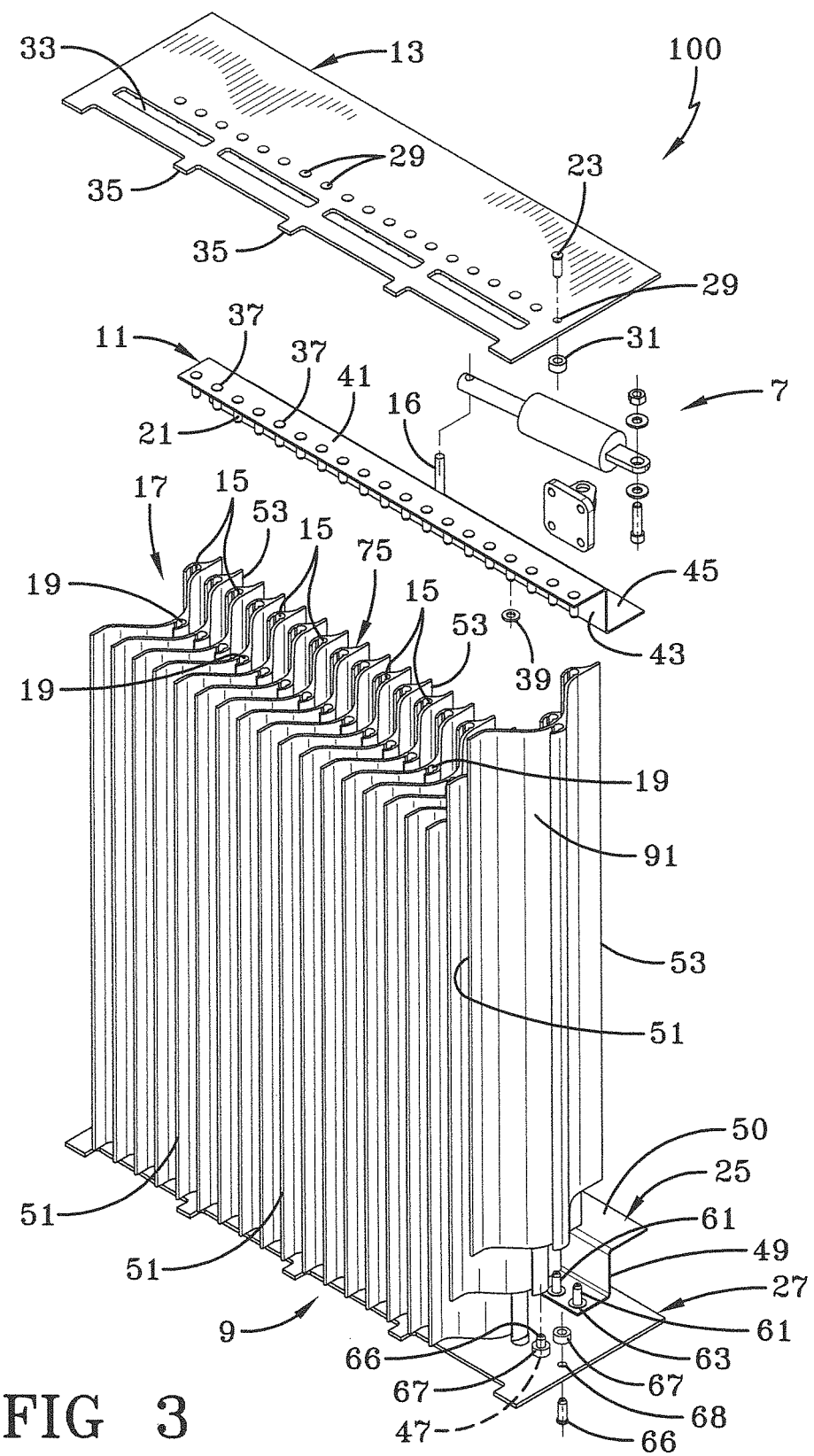
FIG. 3 is a perspective, exploded front view of the moisture and dust removing louver pack shown in FIGS. 1 and 2, in its open position.

Turning next to the exploded view shown in FIG. 3, respective louvers 9' each comprise a louver control arm pin-receptacle 15 which is disposed near a leading end 53 of respective louvers 9'. A fulcrum louver mechanism 17 comprising a louver second fulcrum device in the form of a hinge plate pin-receptacle 19 is discussed below.

The movable support mechanism also includes a lower louver control arm 25. Lower louver control arm 25 and louver hinge-plate 27 together with their respective louver control arm hinge plate pins 61 and hinge plate pins 66 function in a cooperative manner with upper louver control arm 11 and upper hinge plate 13.

Further considering the exploded view shown in FIG. 3, further components of louver pack 100 can be seen. A number of holes 29 are provided for receiving a like number of upper hinge plate pins 23 and hinge pin bearings 31. Upper hinge plate 13 is essentially of a rectangular configuration, having a series of slots 33 for providing openings to the upper ends of individual louvers 9'. Upper hinge plate 13 further includes a set of short flanges 35 which serve as protectors to the portions of individual louvers 9' that otherwise would be exposed. Upper louver control arm 11 is shown, having a series of holes 37 for receiving upper louver control arm hinge pins 21 extending through them, and through respective louver control arm bearings 39. The required number of upper louver control arm hinge pins 21 and louver control arm bearings 39 can be supplied as determined by the number of holes 37. There would be one hole 37 for each moisture and dust removing louver 9' of the set of louvers 9. Upper louver control arm 11 has a horizontal upper section 41 in which holes 37 are located, a vertical wall 43 which is integral with and extending downwardly from wall 41, and a lower horizontal wall 45 forming a support shelf for actuator assembly 7. Lower louver control arm 25 has essentially the same shape as upper control arm 11 but has its position reversed, and does not move. Lower louver control arm 25 has a lower horizontal surface 47, a vertical surface 49 and an upper horizontal surface 50. Extending through lower louver control arm 25 is louver control arm hinge pin 61 which extends through a lower louver control arm bearing 63. Extending through lower hinge plate 27 is lower hinge plate pin 66 which extends through a lower hinge pin bearing 67. A hole 68 is provided for each lower hinge plate pin 66 and lower hinge pin bearing 67, and one of these is provided for each moisture and dust removing louver 9'.

Figure 4:
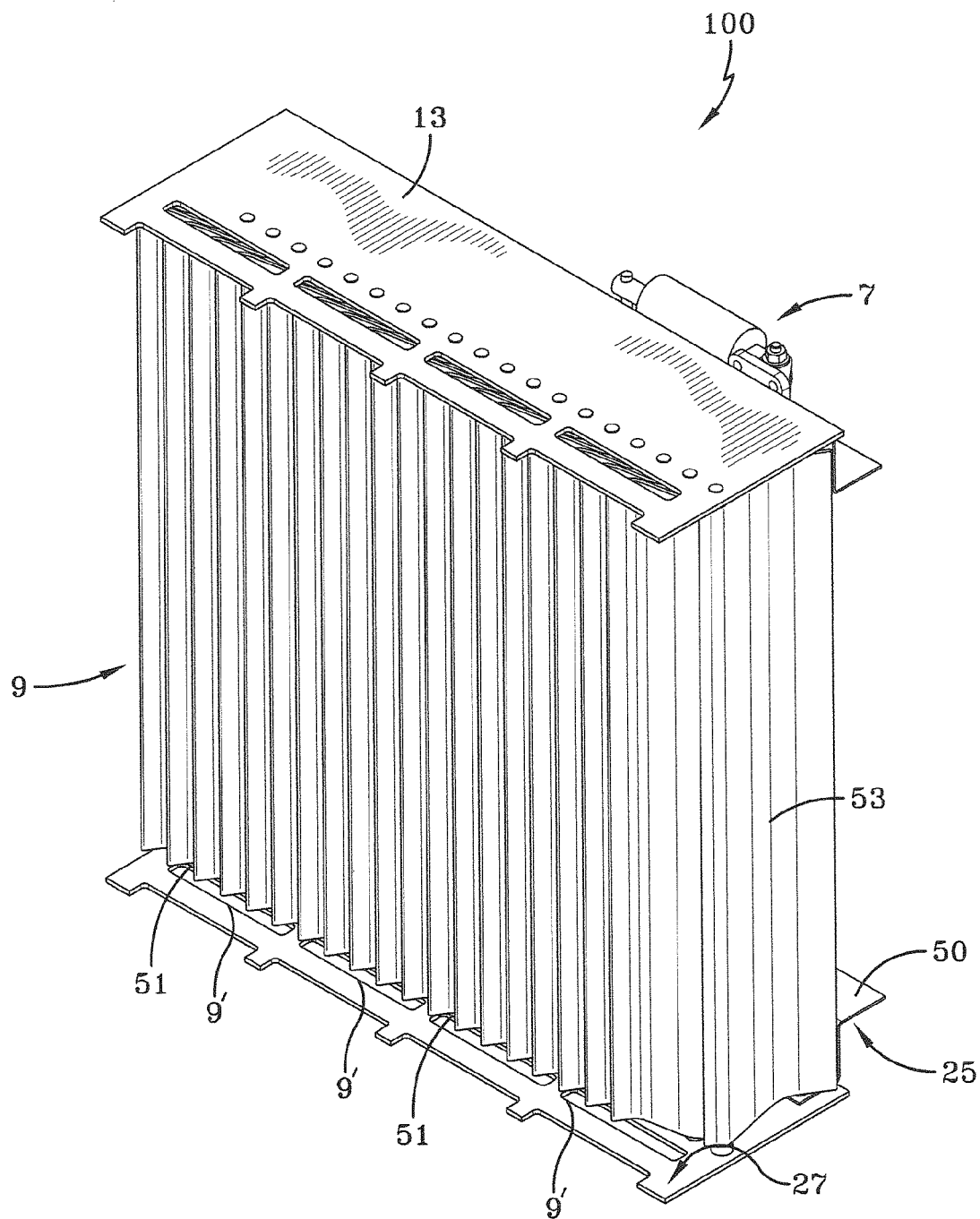
FIG. 4 is a front view of the moisture and dust removing louver pack shown in FIGS. 1-3, in a closed position.

FIG. 4 is a front view of a moisture and dust removing louver pack 100 in its closed position. A comparison of FIG.

Figure 5:
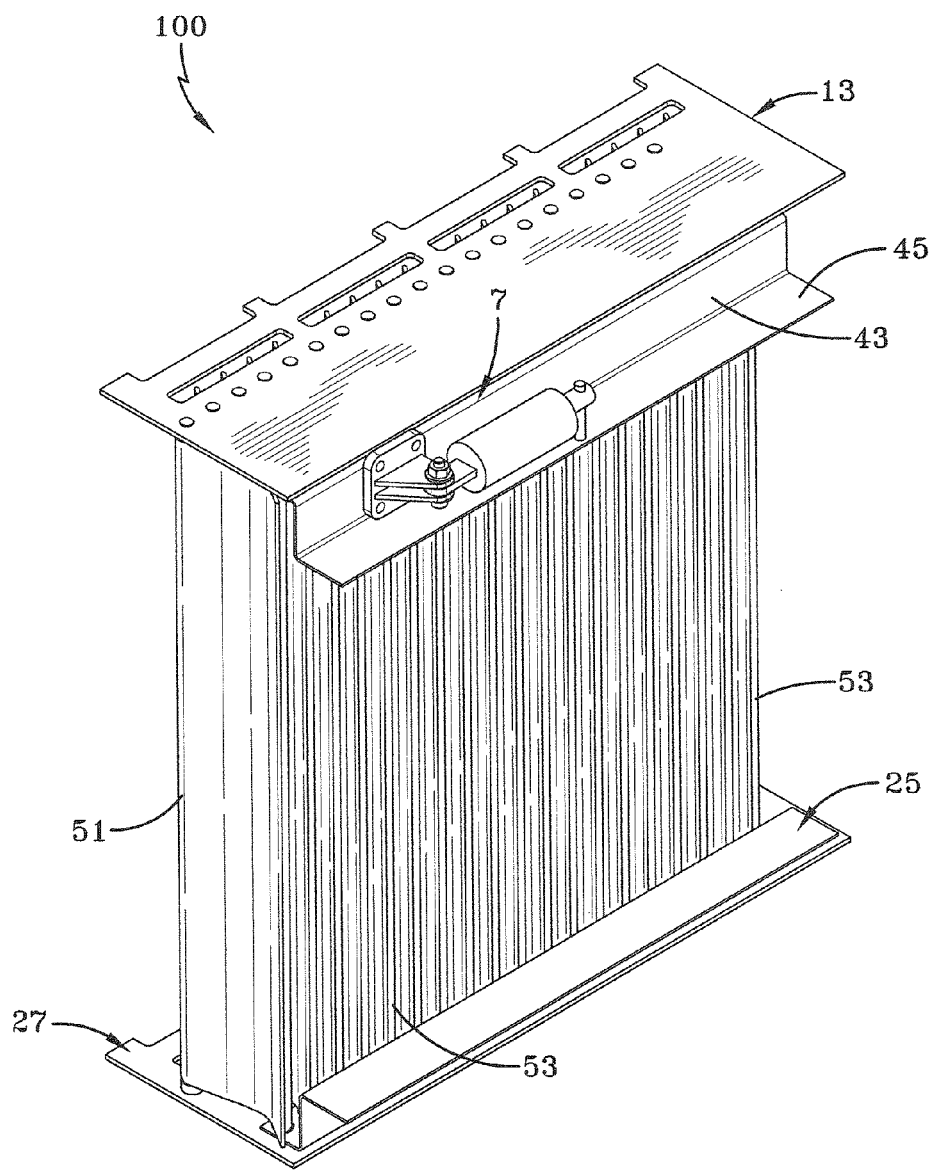
FIG. 5 is a perspective rear view of the moisture and dust removing louver pack shown in FIGS. 1-4, in its closed position.

1 and FIG. 4 shows that louvers 9 in FIG. 1 have their free or leading ends 51 facing forwardly, being angularly rotated by 90° from an imaginary line connecting the short opposing parallel surfaces of upper hinge plate 13, whereas in FIG. 4, those free faces have been rotated clockwise so that the respective inner parts of individual louvers 9' are in contact with each other or in close contact to each other. The same components shown in FIG. 1 are shown in FIG. 4, and references should be made to the discussion regarding FIG. 1 for a discussion of the components shown in FIG. 4. Likewise, FIG. 5 shows the moisture and dust removing louver pack 100 as a rear view in its closed position, that is, with the set of louvers 9 in their closed positions. Each louver 9' has its trailing end 53 in engagement or nearly in engagement with the adjacent vane 9'. The same components are identified, but a description thereof can be found with respect to the description of the same assembly in the open position shown in FIG. 2. A comparison of the views shown in FIG. 2 and FIG. 5 shows that the free ends of individual louvers 9', namely leading end 51 and trailing end 53, are generally perpendicular to a vertical wall 57 of lower louver control arm 25 in FIG. 2 and are rotated clockwise to the closed position of FIG. 5.

Thus, hinge plate pins 23 and 66 extending through hinge plate 1 hold the respective moisture and dust removing louvers 9' in place and provides a fulcrum about which each louver 9' rotates. Louver hinge plate pins 23 and 66 have respective common axes about which respective louvers 9' rotate. Upper louver control arm hinge pins 21 transfer the force from upper louver control arm 11 to respective louvers 9' to provide the torque or movement to pivot respective moisture and dust removing louvers 9' about pins 23 and 66 in louver control arm pin-receptacle 15. Pins 21 apply the force from actuator assembly 7 to receptacles 15 in respective louvers 9' near trailing ends 53 of respective louvers 9' to cause respective louvers 9' to pivot about the respective axes of louver hinge pins 23 and 66.

Each of the hinge pin bearings 31 receive respective hinge plate pins 23 after they have been passed through upper louver plate 13 before they enter respective moisture and dust removing louvers 9'.

Louvers 9' deny the ingress or egress of airflow to a compartment in which louver pack 100 is disposed, such as a ship's engine room compartment, when set of louvers 9 is in the closed position. This is explained in detail below.

Actuator assembly 7 shifts upper control arm 11 to open and close the respective moisture and dust removing louvers 9'. In this respect, actuator attachment pin 16 connects actuator assembly 7 to upper louver control arm 11 as shown. Louver control arm hinge pins 21 are movable louver second pivot devices for each of the moisture and dust removing louvers 9'. Actuator assembly 7 can be a hydraulic actuator, an electric actuator or a mechanical actuator, which are all available in the market in various forms. These actuator assemblies can incorporate a cable connecting upper louver control arm 11 with actuator assembly 7. Actuator assembly 7 could be operated manually or automatically. Louver hinge pins 23 are louver second fulcrum devices which connect upper hinge plate 13 to respective louvers 9' and cooperate with respective receptacles 19 to be a louver second fulcrum device about which respective louvers 9' pivot in response to movement of upper louver control arm 11.

Louver control arm bearing 39 receives each louver control arm hinge pin 21 after pin 21 has passed through upper louver control arm 11. Bearing 39 provides a bearing surface between upper louver control arm 11 and respective moisture and dust removing louvers 9'.

Upper louver control arm 11 moves back and forth (right and left as shown in the drawings) to provide opening and closing motion of the moisture and dust removing louvers 9'. Actuator assembly 7 moves control arm 8 by virtue of actuator attachment pin 16.

Figure 6:
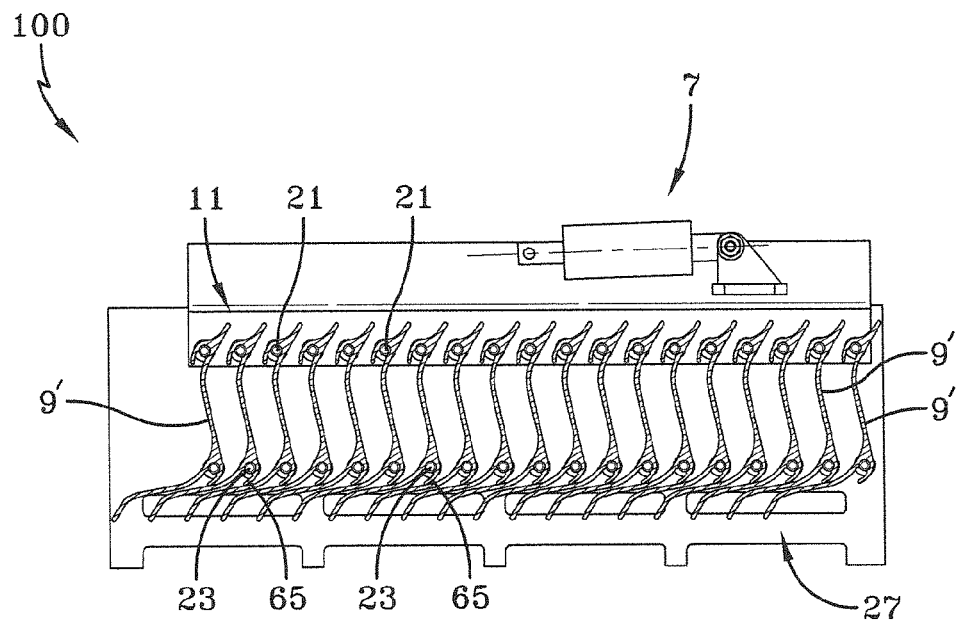
FIG. 6 is a schematic view of the top of the moisture and dust removing louver pack shown in FIGS. 1-5, in its closed position.
Figure 7:
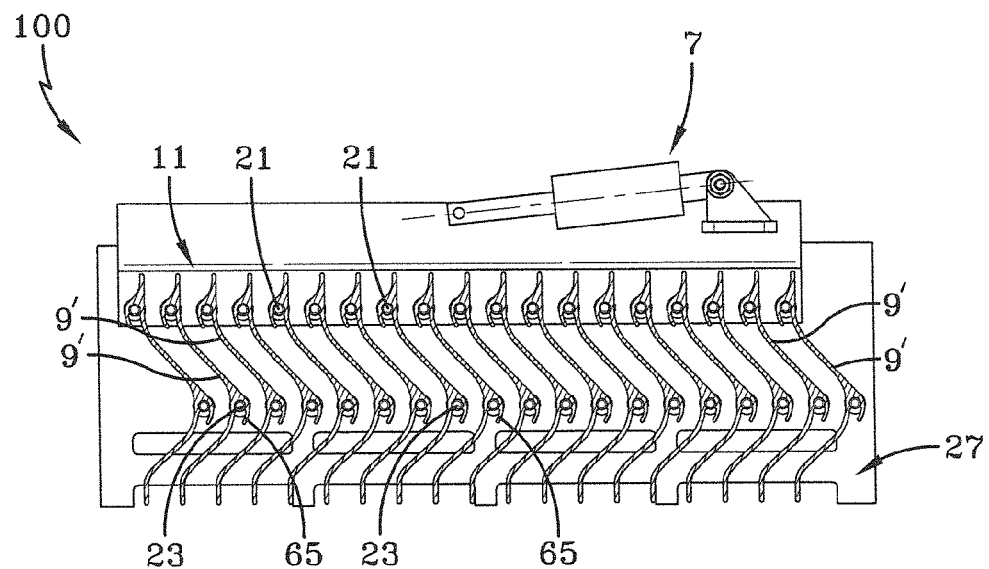
FIG. 7 is a schematic view similar to that in FIG. 6, shown in the open position.

Referring to FIGS. 6 and 7, actuator assembly 7 moves upper louver control arm 11 to the right to move moisture and dust removing louvers 9' to the closed position as shown in FIG. 6. Louvers 9' pivot on louver control arm hinge pins 21 around hinge plate pins 23 to the closed position. Actuator assembly 7 moves upper control arm 11 to the left as shown in FIG. 7 to rotate moisture and dust removing louvers 9' so that each of the latter louvers 9' pivots on louver control arm hinge pin 21 about louver hinge plate pins 23 to their open position. As explained in detail below, it is the engagement of respective forward moisture-separation hooks 65 with the proximate louver 9' that closes louver pack 100 to the flow of air therethrough.

Each air-integrated moisture and dust removing louver 9' is configured to provide a moisture and dust mechanical impingement filter shape and closure louver. Lower louver control arm 25 moves back and forth, right and left (as shown) to assist in providing opening and closing motion for the moisture and dust removing louvers 9.

Hinge plate pins 61 (FIG. 3) enter the lower end of the same receptacle in louver 9' in which upper louver control arm hinge plate pin 23 had entered, to provide the fulcrum or pivot point for the respective moisture and dust removing louvers 9'. Lower louver control arm bearings 63 receive lower louver control arm hinge pins 61 which enter the bottom of the same receptacles 15 whose top hinge plate pin 23 had entered to provide bearing surfaces between lower louver control arm 25 and the respective moisture and dust removing louvers 9. Lower hinge plate pins 61 provide the other pivoting structure for the respective moisture and dust removing louvers 9.

Lower hinge pin bearings 67, through which lower hinge plate pins 61 extend, provide a bearing surface between lower hinge plate 27 and moisture and dust removing louvers 9'. Lower hinge plate pins 67 enter the bottom of the same receptacle 19 of the respective louvers 9' of which louver hinge pin 23 entered the entrance to receptacle 19.

Referring to FIG. 6, it was noted that actuator assembly 7 has moved to the right or retracted position where it shifts upper louver control arm to close moisture and dust removing louvers 9'. The closing prevents the ingress or egress of airflow to the area being controlled, which could be an engine room compartment or any other compartment. Referring to FIG. 7, actuator 7 has moved to the extended position to the left, where it shifted upper louver-control arm 11 to open moisture and dust removing louvers 9' in which forward moisture-separation hooks 65 are no longer engaged with the adjacent louver 9'. In its open position, the ingress or egress of airflow through the air openings between the respective louvers is allowed.

Figure 8:
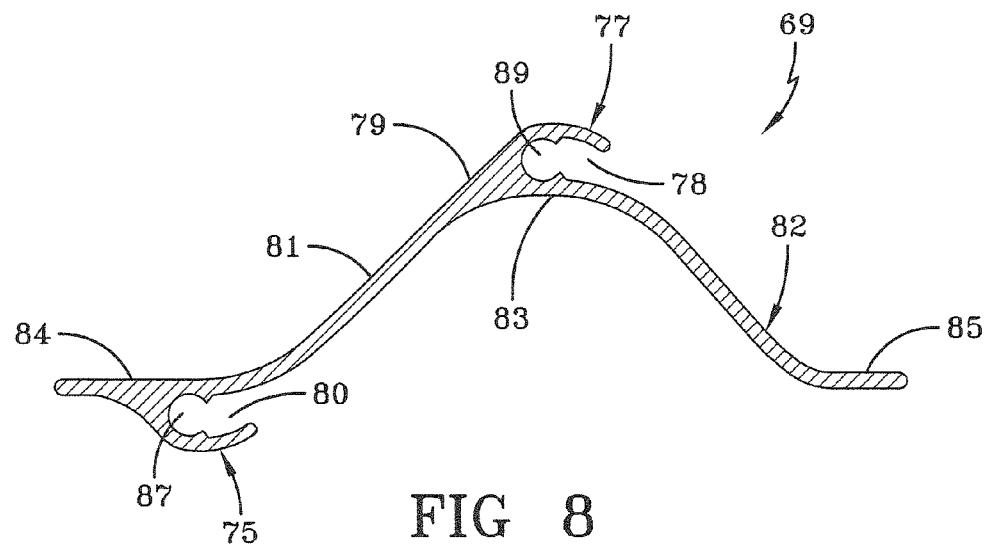
FIG. 8 is a cross-sectional side view of one type of louver for use in the moisture and dust removing louver pack according to a preferred embodiment of the invention.

Turning next to FIG. 8, a side cross section of a possible, but not preferred moisture and dust removing louver 69 is shown. Louver 69 has a rearward or trailing end 84 and a forward or leading end 85. Louver 69 comprises a rearward, forwardly facing, open moisture-separation hook 75 and an open, forwardly facing, moisture-separation hook 77 which is disposed at an intermediate portion 79 of louver 69. Each hook 75 and 77 extends along the height of louver 69 (as do the other hooks disclosed herein for the respective alternate louvers). Hooks 75 and 77, like the hooks described below with various embodiments of louvers, have two main functions. One function is to define receptacles for receiving upper louver control arm hinge pins 21 and lower louver control arm pins 61, and to define receptacles for receiving upper hinge pins 23 and lower hinge pins 66. Another function of the foregoing hook is to enable hooks 75 and 77 to block the passage of moisture and dust from traveling in the airflow passing through louvers 9 when louvers 9 are in the open position. All of the hooks with each embodiment impede the flow of water droplets in the airflow and effect the drainage of the water through a drainage system. Dust in the airflow can similarly be removed from the passage of air.

Hook 77 further defines a water channel 78, and hook 75 defines a water channel 80, channels 78 and 80 being a flow path for water drained from the airflow passing through louver pack 100.

Louver 69, as with the other louvers described herein, has a body with an airfoil configuration for enabling airflow across the louver as those associated within a louver pack, a convex surface and a concave surface. Thus, louver 69 has a body 82, a convex surface 81 and a concave surface 83, each extending between trailing end 84 and leading end 85. Louver 69 has a pivoting location in the form of louver control arm hinge pin receptacle 87 and a fulcrum location in the form of a hinge plate pin receptacle 89.

Figure 9:
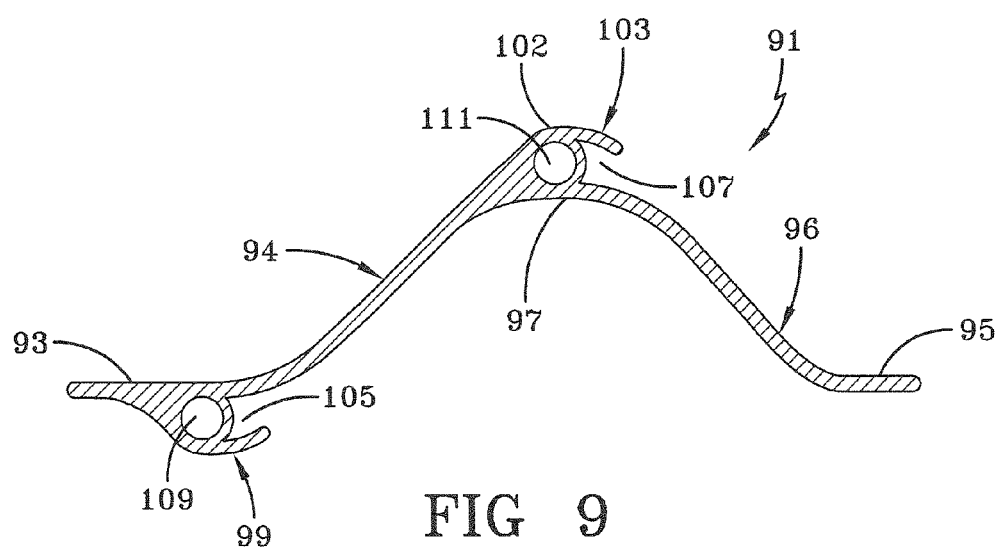
FIG. 9 is a cross-sectional side view of another louver for use in the moisture and dust removing louver pack according to another preferred embodiment of the invention.

An alternate moisture and dust removing louver 91 is shown in FIG. 9. Louver 91 has a rearward or trailing end 93 and a forward or leading end 95. Louver 91 has an airfoil configuration and has a body 94, a convex surface 96 and a concave surface 97. Louver 91 further comprises a rearward moisture-separation hook 99 proximate trailing end 93. Louver 91 has an intermediate portion 102 and a moisture-separation hook 103 located at intermediate portion 102. Hook 99 defines a water channel 105, and hook 103 defines a water channel 107. Walls further define a lower control arm hinge pin receptacle 109 and a hinge plate pin receptacle 111. Louver control arm hinge pins 21 and 61 enter the respective tops and bottoms of respective receptacles 109. Likewise, hinge plate pins 23 and 66 enter the respective tops and bottoms of respective receptacles 111.

Figure 10:
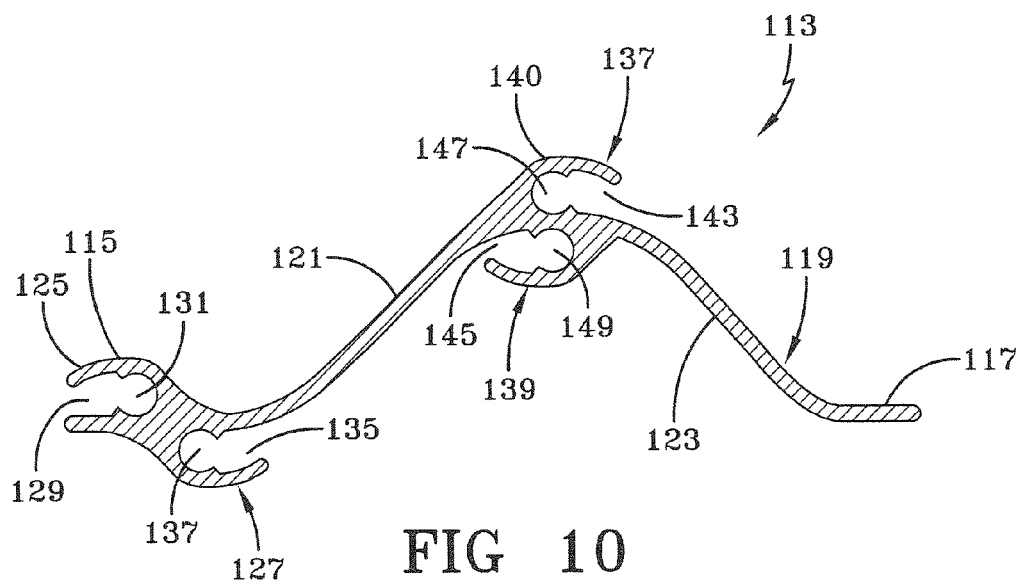
FIG. 10 is a cross-sectional side view of another louver for use in the moisture and dust removing louver pack according to a still further preferred embodiment of the invention.

Another alternate moisture and dust removing louver 113 is shown in FIG. 10. Louver 113 has a rearward or trailing end 115 and a forward or leading end 117. Louver 113 has an airfoil configuration, a body 119, and convex and concave surfaces 121 and 123 respectively.

Louver 113 further has extending from leading end 115 of body 119 a pair of opposing, moisture-separation hooks 125, 127 which extends along the height of louver 113. Hook 125 has interior surfaces defining a water channel 129 and a louver control arm hinge pin receptacle 131, and hook 127 has interior surfaces defining a water channel 133 and a hinge plate pin receptacle 135, each of which function as do the corresponding parts of other louvers described herein. Likewise, moisture-separation hooks 137 and 139 located at an intermediate portion 140 of louver 131 on convex surface 121 and concave surface 123, respectively, define water channels 143 and 145, and hinge plate pin receptacles 147 and 149, all of which function as do other louvers described herein.

Figure 11:
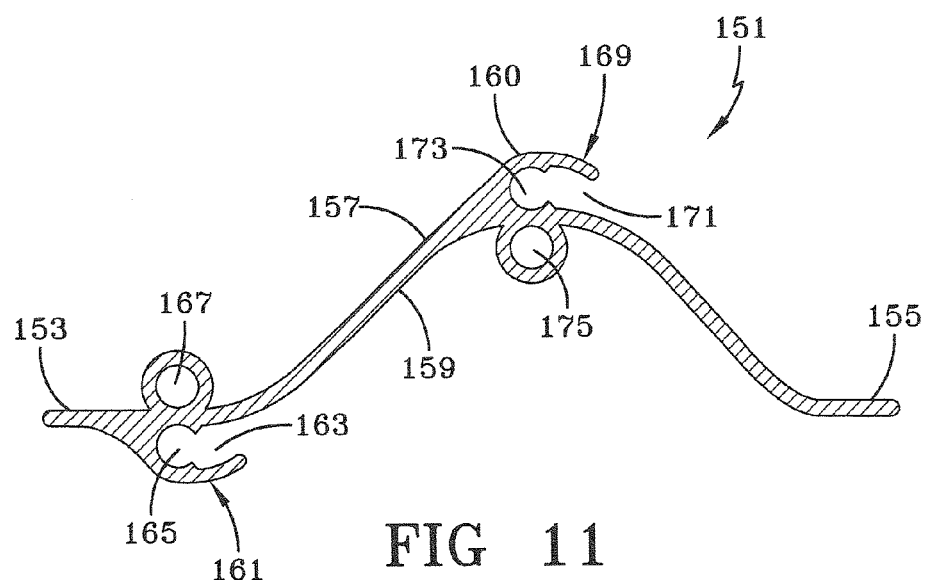
FIG. 11 is a side, cross-sectional view of another louver for use in the moisture and dust removing louver pack according to yet a further preferred embodiment of the invention.

Another alternate moisture and dust removing louver 151 is shown in FIG. 11. Louver 151 has a rearward or trailing end 153 and a forward or leading end 155. Louver 151 has an airfoil configuration with a convex surface 157, a concave surface 159 and an intermediate portion 160. Louver 151 is similar to and functions generally as does louver 113. A rearward or trailing, forwardly facing, moisture-separation hook 161 extends from the concave surface of louver 151, and defines a water channel 163 and a louver control arm pin receptacle 165. Walls define a louver control arm pin receptacle 167 on concave surface 157. A forwardly facing moisture-separation hook 169 is on convex surface 151 at intermediate section 160. Hook 169 has interior surfaces defining a water channel 171 and a hinge plate pin receptacle 173. Walls define a hinge plate pin receptacle 175 at intermediate portion 160 on concave surface 159.

Figure 12:
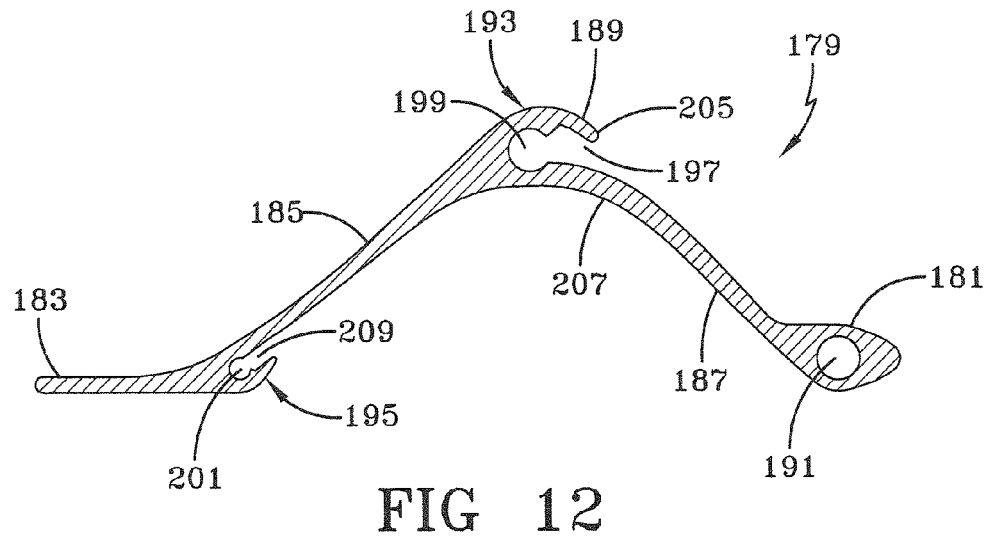
FIG. 12 is a side, cross-sectional view of another louver for use in the moisture and dust removing louver pack according to still another preferred embodiment of the invention.

Another cross section of a moisture and dust removing louver 179 is shown in FIG. 12, and it functions very similarly to louvers 69 and 91. Louver 179 has a forward or leading end 181 and a rearward or trailing end 183. Louver 179 has a convex surface 185, a concave surface 187 and an intermediate portion 189. Louver 179 has an airfoil configuration. Louver 179 comprises a forward louver control arm pin receptacle 191, a moisture-separation hook 193 at intermediate portion 189 on convex surface 185, and a trailing moisture-separation hook 195. Hook 193 has interior surfaces defining a water channel 197 and a hinge plate pin receptacle 199. Hook 195 has interior surfaces defining a water channel 201. Airfoil-shaped leading end 181 extends along the height of louver 179 to enable inviscid gas flow over louver 179. As the gas flow makes a tortuous turn, the moisture and dust is impinged on an upper camber 205, the latter having an airfoil shape. The impinged moisture and dust is captured forwardly facing moisture-separation hook 193, which extends along the height of louver 179, and drains down channel 197, which also extends along the height of the louver 110.

Gas flow continues over hook 193 and along an aft upper rear trailing end 183 flowing and exiting along trailing end 183. Gas flow is present under leading end 181 and moves along a rearward lower camber 209 making a tortuous turn causing impingement of moisture and dust, which is captured by rear moisture-separation hook 195 which extends along the length of the louver 179 and drains in water channel 201.

Figure 13:
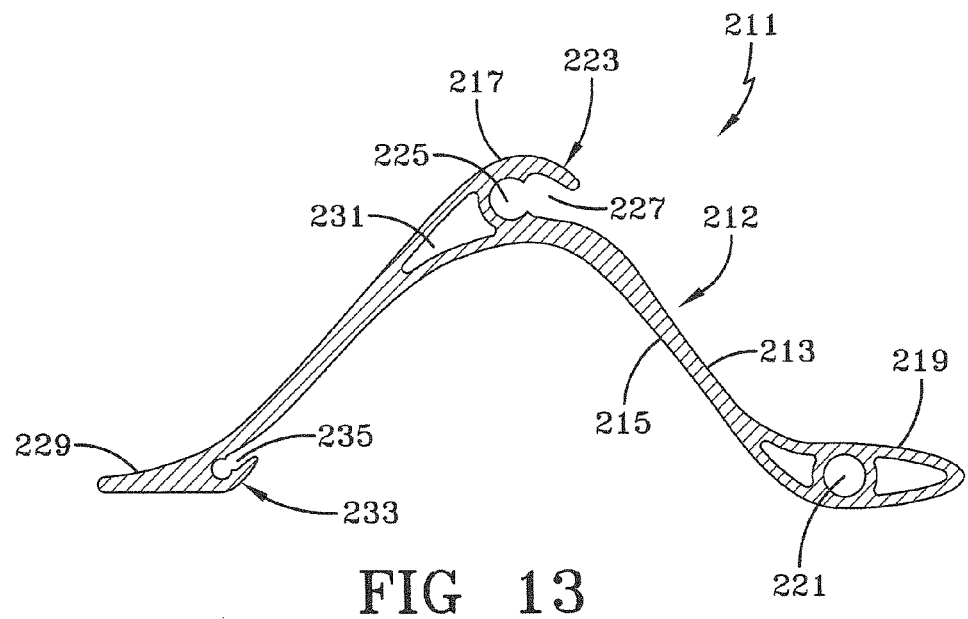
FIG. 13 is a side, cross-sectional view of still another inventive louver for incorporation in a moisture and dust removing louver pack pursuant to a preferred embodiment of the invention.
Figure 14:
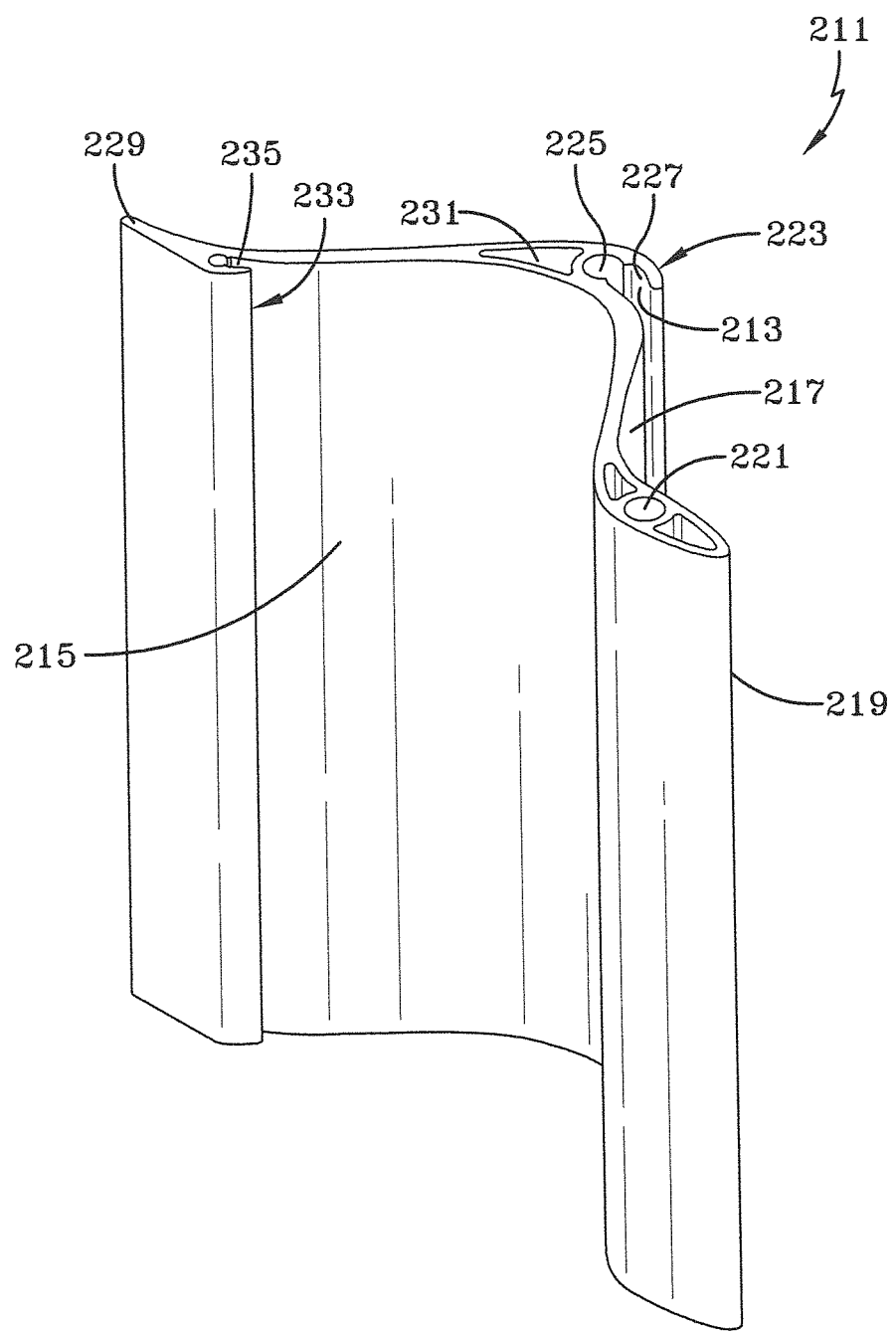
FIG. 14 is a perspective view of the same louver.
Figure 15:
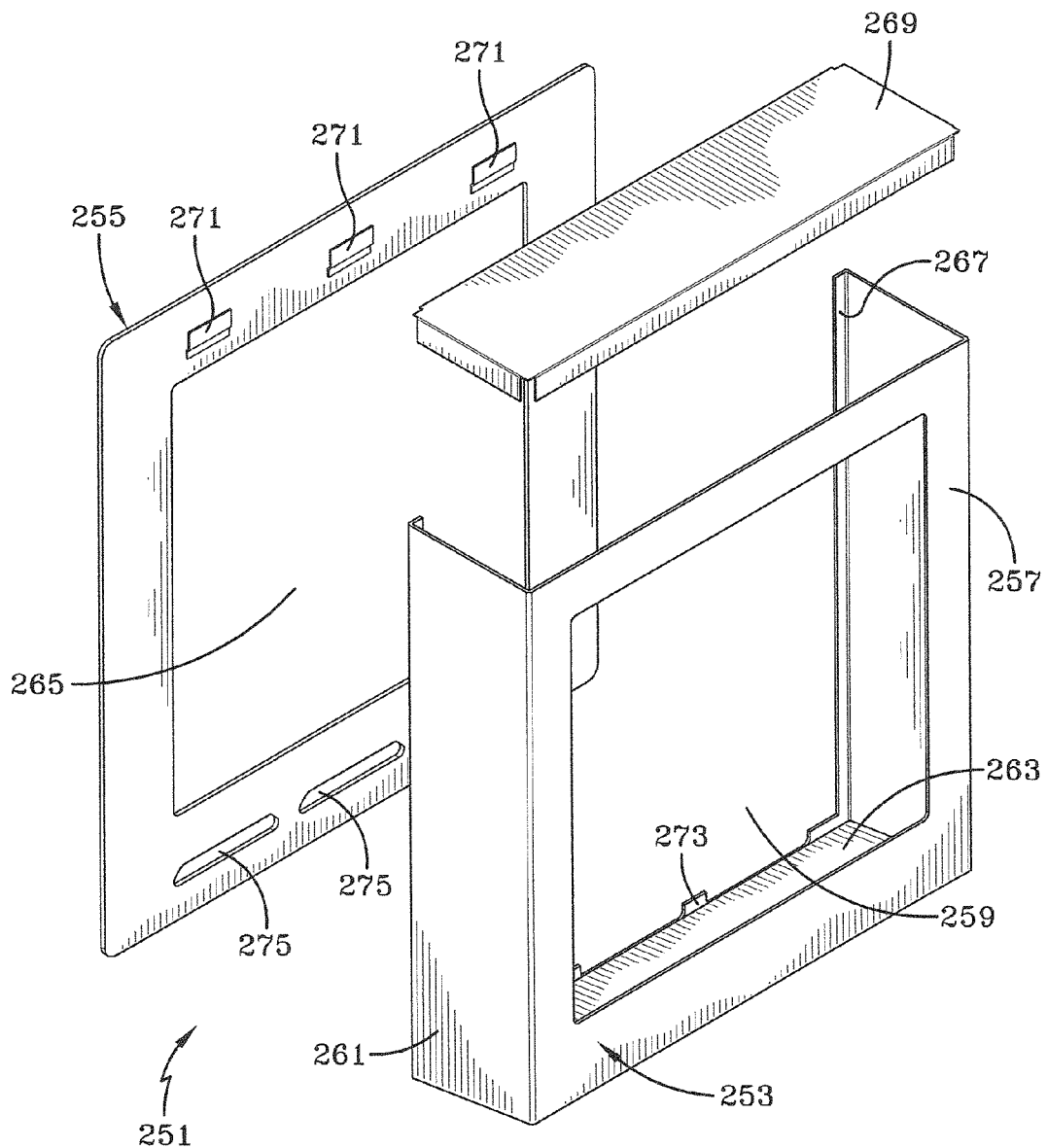
FIG. 15 is a rear exploded view of a drain pan frame for use with the louver pack shown in FIGS. 1-7.
Figure 16:
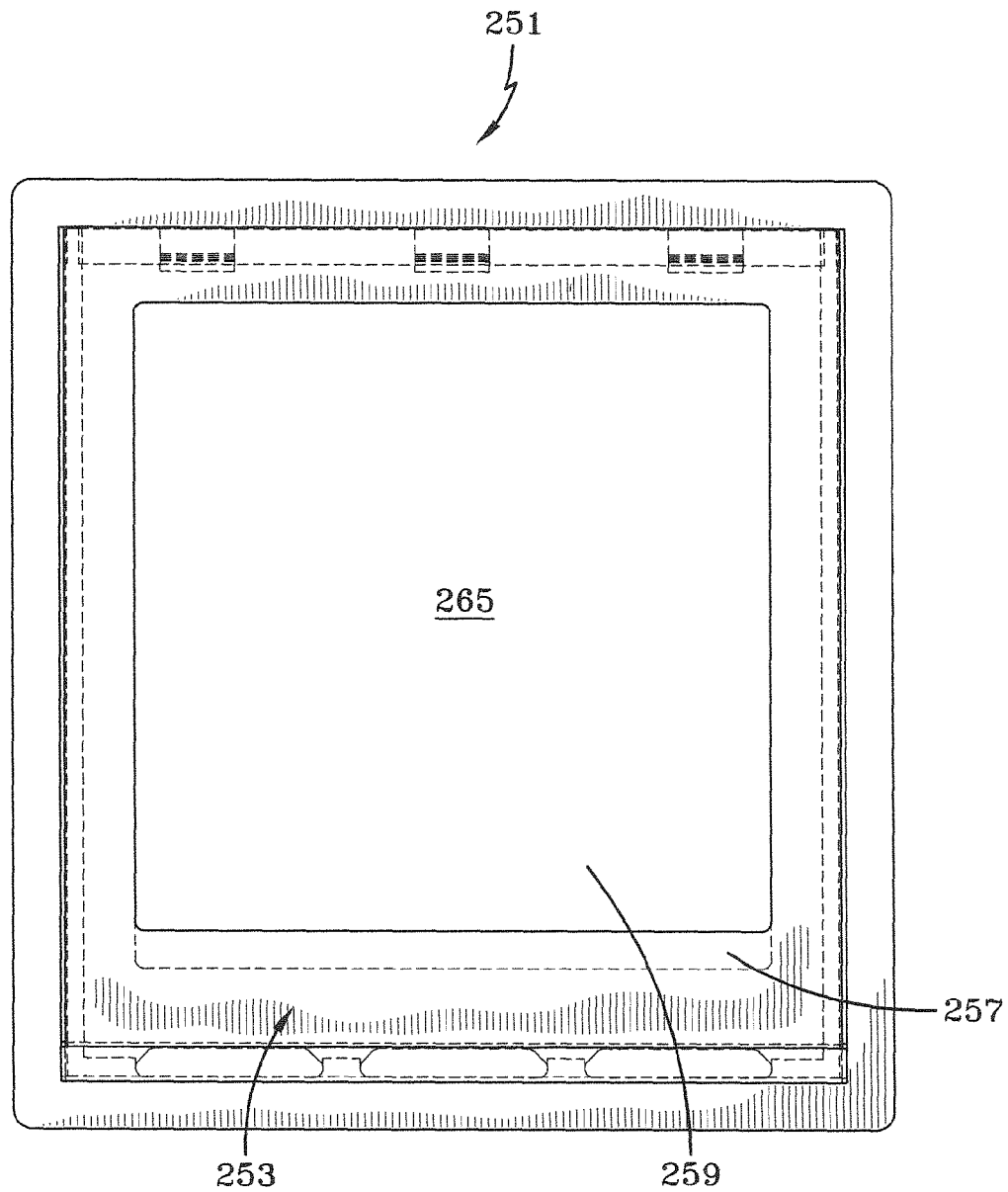
FIG. 16 is a rear view of a face drain frame for use with a louver pack according to the preferred embodiments of the invention.
Figure 17:
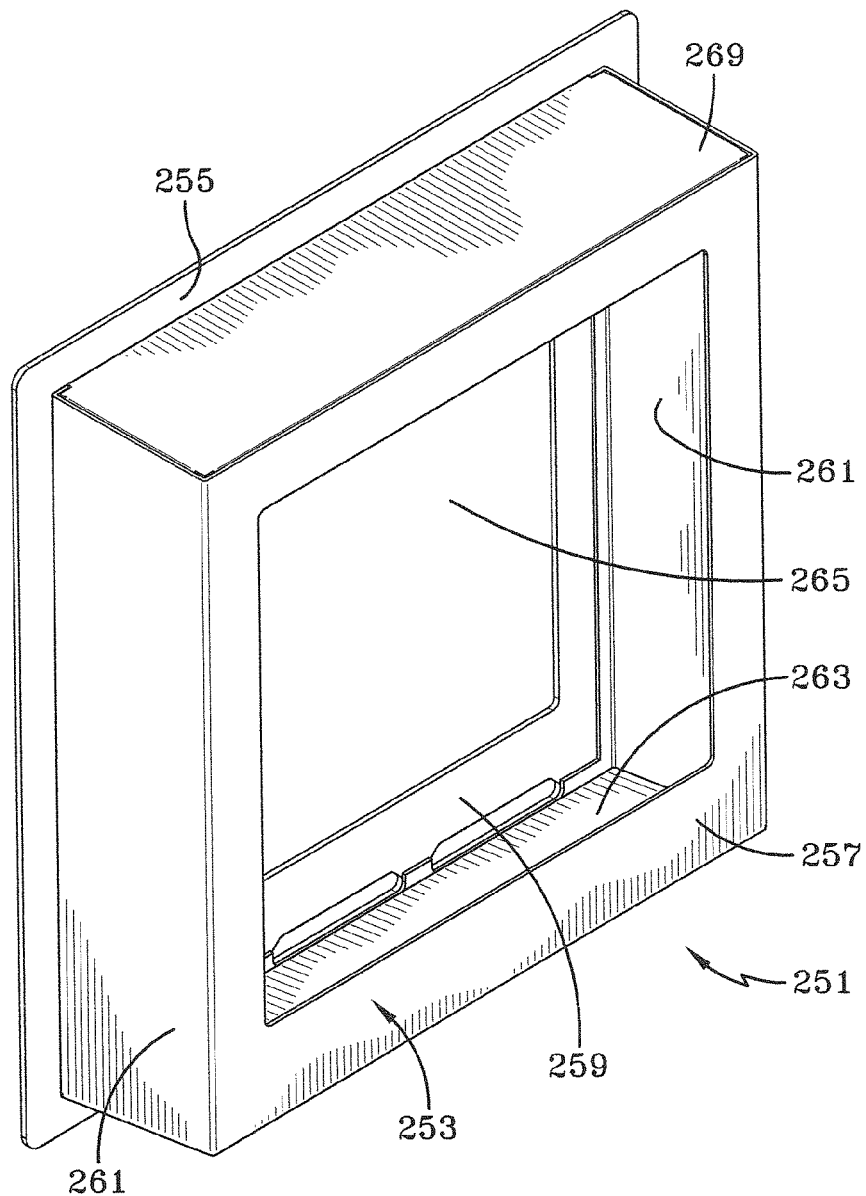
FIGS. 17 and 18 are rear perspective views of the face drain frame shown in FIG. 16.
Figure 18:
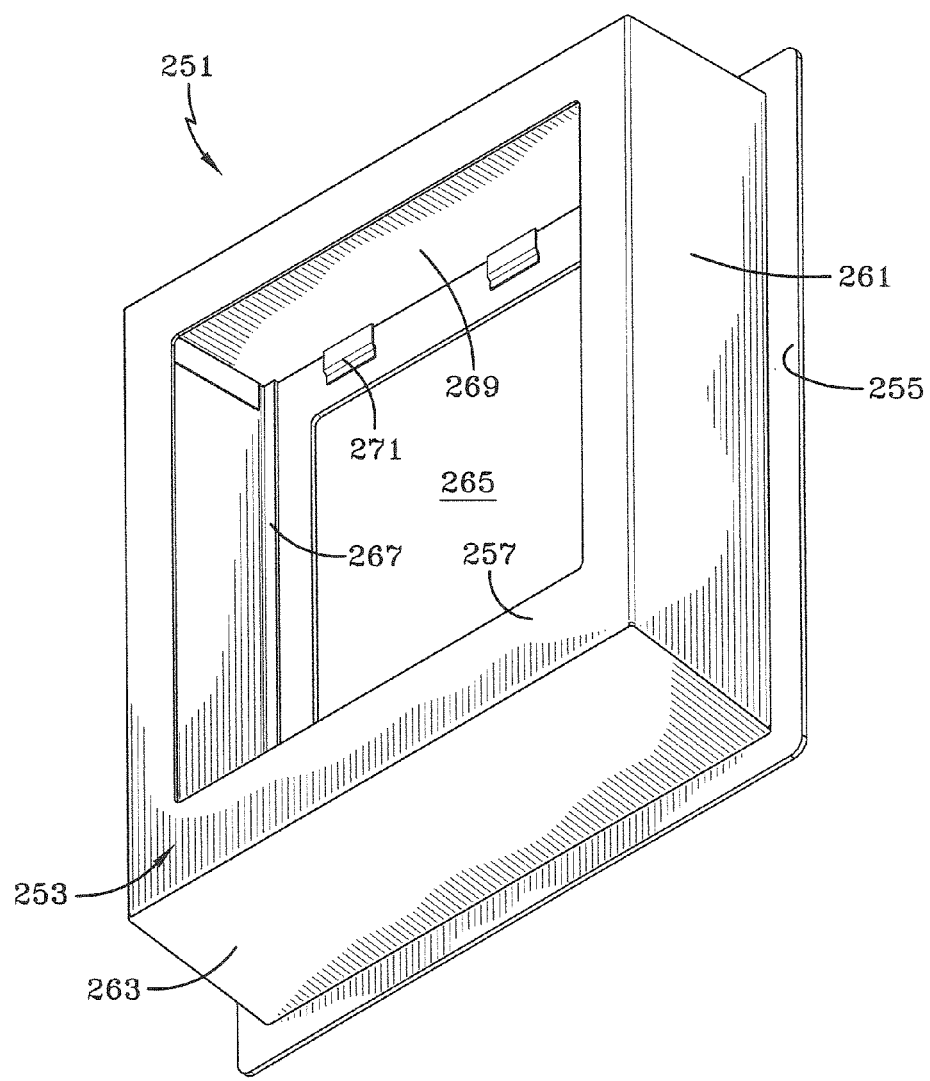

It has been found that a moisture and dust removing louver 211 shown in FIGS. 13 and 14 is a particularly advantageous louver for the present invention. Louver 211 has a body 212 with a convex surface 213, a concave surface 215 and an intermediate portion 217, and further has an airfoil configuration. Louver 211 is comprised of a forward or leading end 219 having a louver control arm pin receptacle 221 for receiving upper louver control arm pins 21 at its upper end and lower control arm pins 61 at its lower end. Louver 211 has a moisture-separation hook 223 at intermediate portion 217 which defines a lower control pin receptacle 225 and a water channel 227.

Louver 211 further includes a rearward or trailing end 229. Formed at intermediate portion 217 is a hollow portion 231 which provides a generally equal thickness because louver 211 (and the other louvers discussed herein) is preferably made from an appropriate aluminum by extrusion. A rear, forwardly facing moisture-separation hook 233 defines a water channel 235.

FIG. 14 shows end louver 211 in perspective, and the same identification numbers that were used in FIG. 13 are used in FIG. 14. Louver 211 was designed for and accomplishes exceptional moisture and dust capture with a very low pressure drop. It has been found that impingement-type louvers or separators improve inefficiency as velocity of the air passes through a set of such louvers or separators. It has been found that as velocity rises, the ability of the product to separate smaller particles also improves, but there is a limit to the maximum velocity allowed. It was further found that the velocity at the inlet face of louver 211 (or similar louvers) must never exceed 2,000 ft/min, or ten meters per second, due to the fact that gravity is utilized to drain the entrapped particles. It was further found that when air velocities exceed 1750 ft/min (8.9 meters/sec) yields degraded effectiveness of any impingement louver or separator. This has been found to exist because the force exerted by the pressure of the air passing through the impingement product approaches or exceeds the force of gravity required to drain the captured moisture droplets and particles, any moisture captured simply remains suspended unable to drain. Suspended moisture will quickly flood and pass through the impingement product. A louver pack built according to the discussion herein of louver pack 100 with louvers 211 has been modeled and tested with 15 micron and 30 micron droplet sizes yielding excellent results. It has been found that as the velocity of the air increases from 2.79 to 6.35 meters/second, the moisture capture rate increases from a little more than 50 to about 100.

The airflow configuration of the respective louvers has been determined using computer fluid dynamics or "CFD." This involves the use of numerical methods and algorithms to solve and analyze problems that involve fluid flows. This is accomplished using computer calculations which simulate the interaction of fluids and gases defined by boundary conditions.

A moisture and dust removing louver pack 100 should ordinarily be mounted in an appropriate frame. In the situation where louver pack 100 is to be used in a face drain, a frame 251 shown in FIGS. 15-18 would be appropriate. Frame 251 includes a front portion 255 and a rear wall 253. Front portion 255 includes a rear frame 257 defining a rear opening 259 through which air and moisture and other materials carried by air would flow. Rear portion 253 further includes side walls 261 and a bottom portion 263. Louver pack 100 basically sits on bottom portion 263 between side walls 261. Front wall 255 also defines an opening 265 through which air can flow through louver pack 100 when louvers 9' are in their open position. A set of tabs 267 on the inside portion of front wall 255 are provided for fixing upper hinge plate 1 to the inside portion front wall 255. When water and other deleterious materials are removed from louver pack 100 by flowing down the respective channels, this material basically flows from frame 251 across the boat deck and into the ambient water. Frame 251 further has a top plate 269. Front wall 255 has bent tabs 271 for engaging top plates 269 and hold top plate 269 in place in frame 251. Frame 251 is made from an appropriate sheet metal such as sheet aluminum, except for the top plate 269 which is made from stainless steel. The component parts connected by full TIG continuous exterior weld seam. Tabs 267 are connected with a TIG stitch weld. Rear frame 253 has a tab 273 which is welded between drain slots 275 with a TIG interior weld. Drain slots 275 are located in front wall 255.

Figure 19:
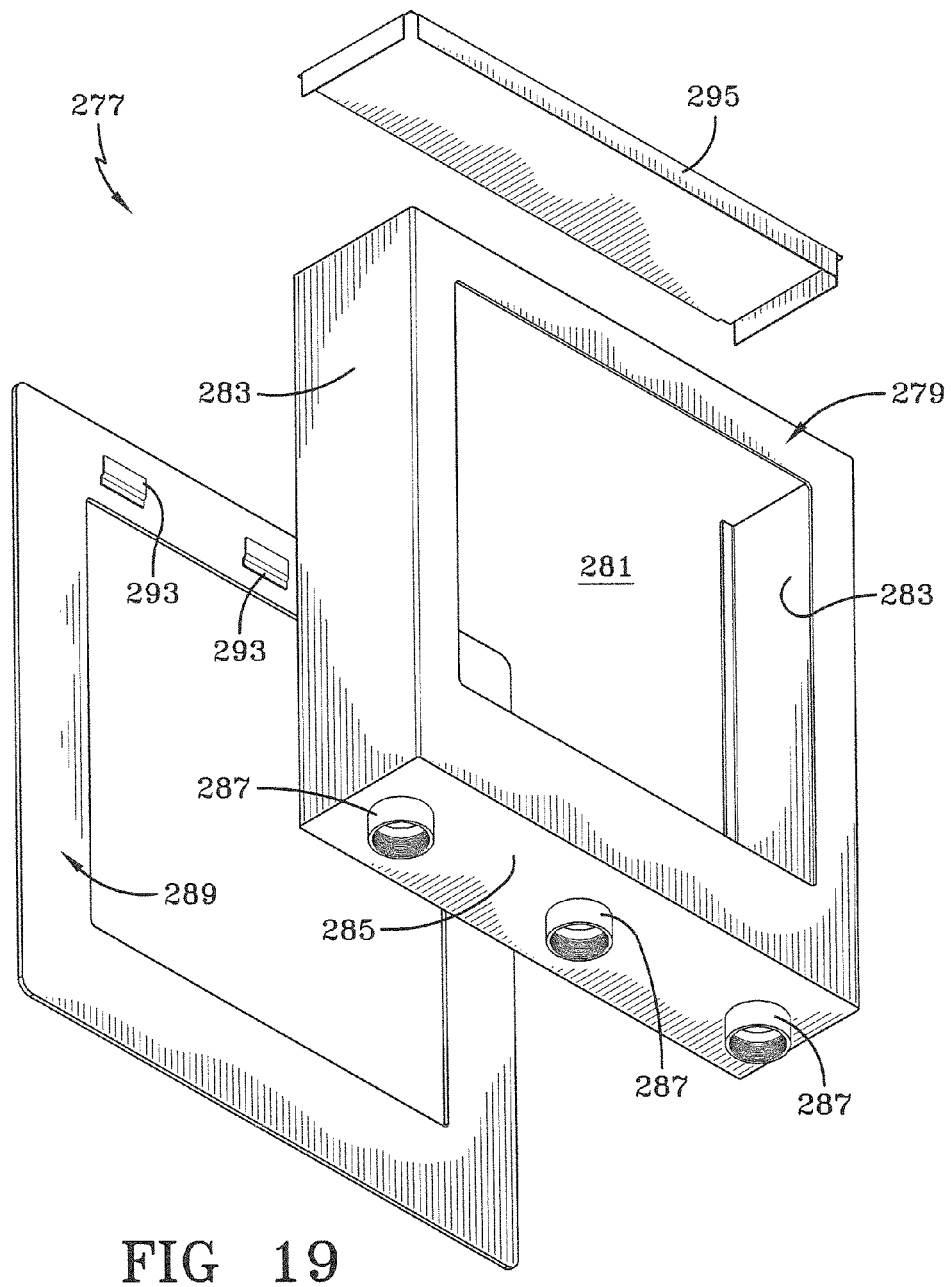
FIG. 19 is a rear perspective exploded view of the sump drain frame shown in FIGS. 11-18.
Figure 20:
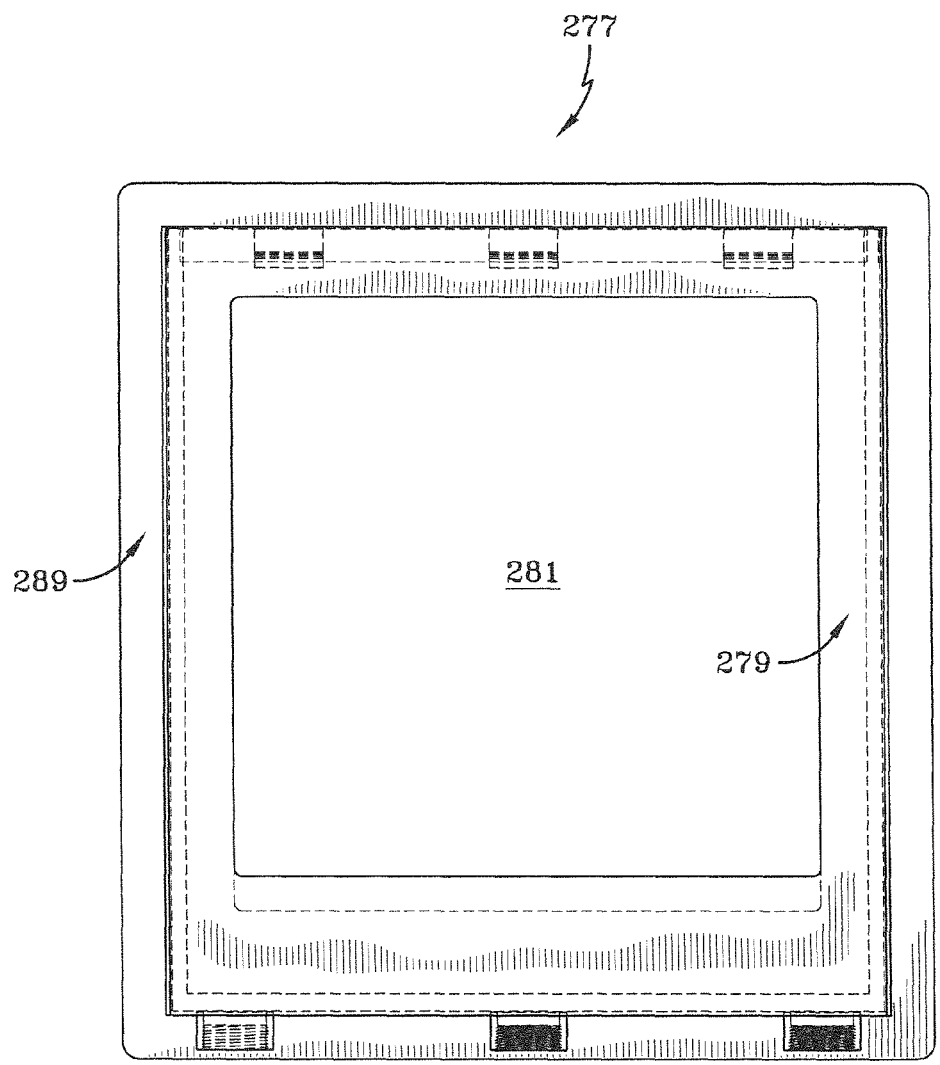
FIG. 20 is a front view of a sump drain frame for use with a louver pack according to the preferred embodiments of the invention.
Figure 21:
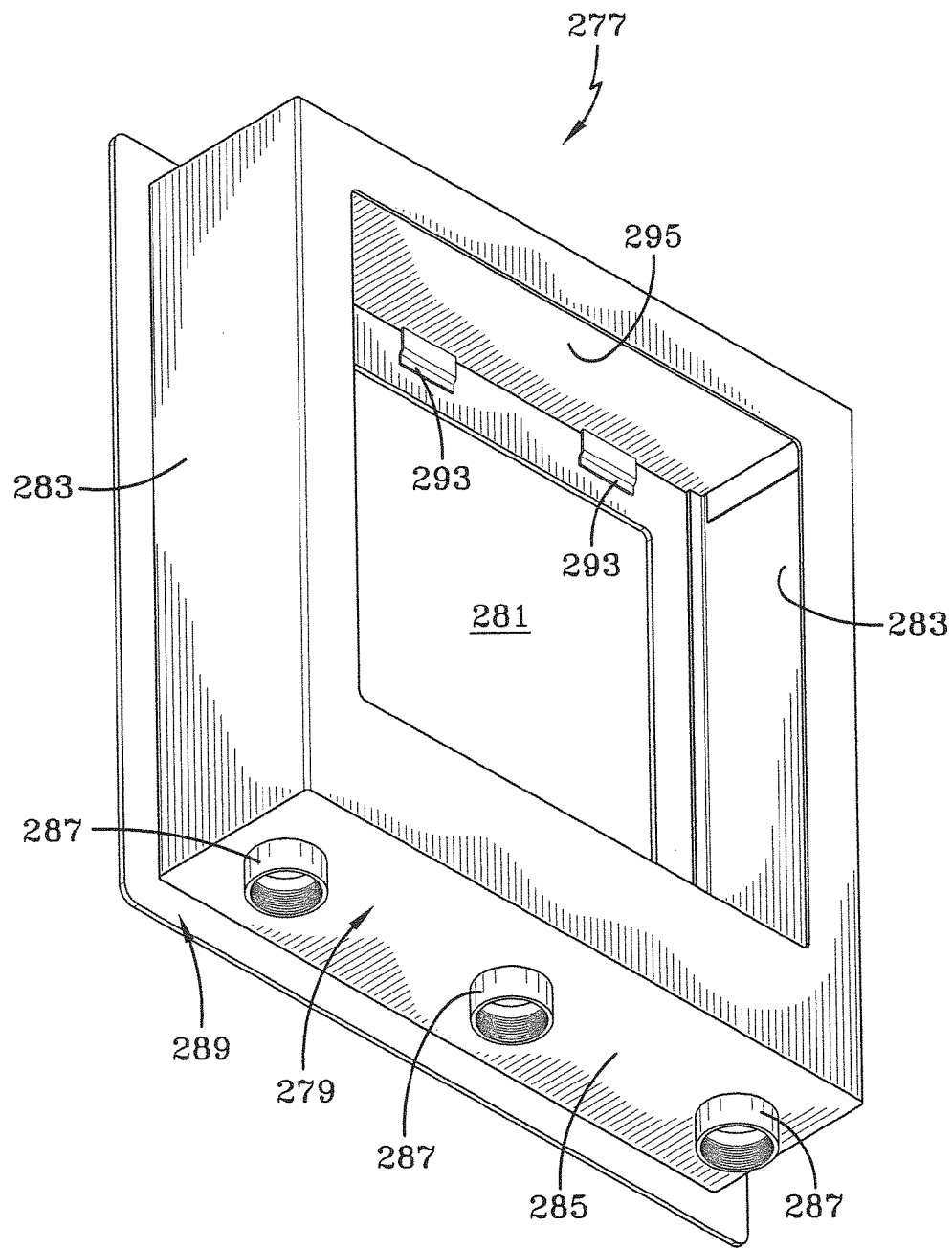
FIG. 21 is a front, perspective view of a sump drain frame for use with a louver pack according to the invention.

A sump drain frame 277 is shown in FIGS. 19-21. These figures show bottom drain 277 as including a rear portion 279 defining a rear opening 281, side walls 283 and a bottom portion 285 having a series of orifices with pipes 287 which would be connected to appropriate hoses leading to the bilge of the boat. A front plate 289 defines a front opening 291 through which air may flow. Appropriate tabs 293 extending from rear plate 289 are used to attach front plate 289 to rear portion 279. Sump drain frame 277 has a top plate 295.

In the prior art little or no attention has been paid to either louvers that can move between open and closed positions and to the aerodynamic design/shape of moisture and dust removing louvers. The novelty of the present invention is its ability to act as a moisture and dust removing louver. Also, the aerodynamic shape of the louver significantly decreases the pressure drop across the moisture and dust removing louver. The result of a lower pressure drop means that a smaller opening in the compartment is required to supply a predetermined amount of airflow.

The invention has been described in detail with particular emphasis on the preferred embodiments thereof, but variations and modifications will appear to those skilled in the art from the appended claims.

We claim:

1. A moisture and dust removing louver pack for being placed in an air passageway and for removing moisture and dust from airflow flowing through the air passageway, said moisture and dust removing louver pack comprising:

a louver support structure comprising a hinge plate for supporting louvers for pivotal movement in the air passageway;

a set of louvers supported in said louver support structure in the air passageway for pivotal movement between a closed position for closing and sealing the air passageway to obstruct the flow of air through the air passageway and an open position for allowing the flow of air through the air passageway, said set of louvers including at least two one-piece, rigid louvers, said at least two one-piece, rigid louvers each comprising:

a one-piece, rigid louver body having an airfoil configuration enabling airflow across said at least two one-piece, rigid louvers as a generally laminar flow when said set of louvers is in an open position, said airfoil configuration being generally smooth enough to transfer air passing over said airfoil configuration as laminar flow, wherein said one-piece, rigid louver body of respective one-piece, rigid louvers comprises:

a leading end;

an airfoil tip at said leading end, said airfoil tip is a symmetrical airfoil tip comprising:

a curved upper surface;

a curved lower surface; and a curved leading edge operatively connecting said curved upper surface and said curved lower surface;

said symmetrical airfoil tip having a cross-sectional configuration wherein said curved upper surface is positioned as a mirror image of said curved lower surface about a straight imaginary line defined by a locus of points midway between said curved upper surface and said curved lower surface;

a trailing end;

a convex surface and an opposing concave surface extending respectively between a place approximate said leading end and said trailing end;

an intermediate portion between said leading end and said trailing end;

said convex surface has a convex leading surface extending between said leading end and said intermediate portion and a convex trailing surface extending between said intermediate portion and said trailing end;

said concave surface has a concave leading surface extending between said leading end and said intermediate portion and a concave trailing surface extending between said intermediate portion and said trailing end;

at least one fulcrum location located at said intermediate portion; and at least one pivoting location located proximate said leading end for receiving a force to effect the pivoting of each of said respective one-piece, rigid louvers between the closed position and a range of open positions about said at least one fulcrum location;
at least one louver control arm pin-receptacle at said respective at least one pivoting location; and
at least one hinge plate pin-receptacle at said respective at least one fulcrum location;
a moisture and dust removing structure for removing moisture and dust from air flowing past each of said respective one-piece, rigid louvers, said moisture and dust removing structure comprising a protrusion extending from said airfoil configuration, said protrusion being a continuation of the airfoil configuration of said one-piece, rigid louver body and comprising a moisture-separation hook having a fixed portion integral with said one-piece, rigid louver body on a free end surface defining with said one-piece, rigid louver body, a moisture-collection opening facing said leading end of said respective one-piece, rigid louvers, said moisture-collection opening collecting moisture and dust removed from air passing across said moisture-separation hook when said at least two one-piece, rigid louvers are in an open position;
a louver pivoting structure for enabling the pivoting of said at least two one-piece, rigid louvers between the closed position and a range of open positions, said louver pivoting structure comprising:
at least one louver control arm hinge pin interconnecting said louver control arm and said respective at least one louver control arm pin-receptacle; and
at least one hinge plate pin interconnecting said hinge plate and said respective at least one hinge plate pin-receptacle; and
a movable support mechanism for selectively applying force to said louver pivoting structure for pivoting said at least two one-piece, rigid louvers between the closed position and a range of open positions, said movable support mechanism comprising a louver control arm;
said respective one-piece, rigid louvers pivoting about said respective at least one hinge plate pin interconnecting said respective one-piece, rigid louvers and said hinge plate in response to movement of said louver control arm, causing the pivoting of said respective one-piece, rigid louvers from said closed position towards an open position or from an open position towards said closed position.

2. A moisture and dust removing louver pack according to claim 1 wherein said moisture and dust removing structure is located on said concave surface at said intermediate portion, said moisture and dust removing structures of adjacent louvers contacting each other in an air-sealing engagement when said set of louvers is in the closed position to seal said louver pack against airflow therethrough.

3. A moisture and dust removing louver pack according to claim 1 wherein said moisture and dust removing structure is located in proximity to at least one of said leading end, said trailing end, and said intermediate portion of said respective one-piece, rigid louvers.

4. A moisture and dust removing louver pack according to claim 1 wherein said at least one louver control arm is an upper louver control arm, and said hinge plate is an upper hinge plate.

5. A moisture and dust removing louver pack according to claim 1 and further comprising an actuator assembly for selectively moving said at least one louver control arm to effect the movement of said set of louvers between an open position and said closed position.

6. A moisture and dust removing louver pack according to claim 1 and further including a drainage assembly for draining water from said respective moisture-separation hooks out of said set of louvers.

7. A moisture and dust removing louver pack for being placed in an air passageway and for removing moisture and dust from airflow flowing through the air passageway, said moisture and dust removing louver pack comprising:
a louver support structure comprising a hinge plate for supporting louvers for pivotal movement in the air passageway;
a set of louvers supported in said louver support structure in the air passageway for pivotal movement between a closed position for closing and sealing the air passageway to obstruct the flow of air through the air passageway and an open position for allowing the flow of air through the air passageway, said set of louvers including at least two one-piece, rigid louvers, said at least two one-piece, rigid louvers each comprising:
a one-piece, rigid louver body having an airfoil configuration enabling airflow across said at least two one-piece, rigid louvers as a generally laminar flow when said set of louvers is in an open position, said airfoil configuration being generally smooth enough to transfer air passing over said airfoil configuration as laminar flow, wherein said one-piece, rigid louver body of respective one-piece, rigid louvers comprises:
a leading end;
an airfoil tip at said leading end, said airfoil tip is a symmetrical airfoil tip comprising:
a curved upper surface;
a curved lower surface; and
a curved leading edge operatively connecting said curved upper surface and said curved lower surface;
said symmetrical airfoil tip having a cross-sectional configuration wherein said curved upper surface is positioned as a mirror image of said curved lower surface about a straight imaginary line defined by a locus of points midway between said curved upper surface and said curved lower surface;
a trailing end;
a convex surface and an opposing concave surface extending respectively from a place approximate said leading end and said trailing end;
an intermediate portion between said leading end and said trailing end;
said convex surface has a convex leading surface extending between said leading end and said intermediate portion and a convex trailing surface extending between said intermediate portion and said trailing end;
said concave surface has a concave leading surface extending between said leading end and said intermediate portion and a concave trailing surface extending between said intermediate portion and said trailing end;
at least one fulcrum location located in proximity to at least one of said leading end, said trailing end, and said intermediate portion of said respective one-piece, rigid louvers;
at least one pivoting location located proximate said leading end for receiving a force to effect the pivoting of each of said respective one-piece, rigid louvers between the closed position and an open position about one of said at least one fulcrum location;

at least one louver control arm pin-receptacle at said respective at least one pivoting location; and at least one hinge plate pin-receptacle at said respective at least one fulcrum location;

a moisture and dust removing structure located on said one-piece, rigid louver body of respective one-piece, rigid louvers for removing moisture and dust from air flowing past each of said respective one-piece, rigid louvers, said moisture and dust removing structure comprising a protrusion extending from said airfoil configuration, said protrusion being a continuation of the airfoil configuration of said one-piece, rigid louver body and comprising a moisture-separation hook having a fixed portion integral with said one-piece, rigid louver body on a free end surface defining with said one-piece, rigid louver body, a moisture-collection opening facing said leading end of said respective one-piece, rigid louvers, said moisture-collection opening collecting moisture and dust removed from air passing across said moisture-separation hook when said at least two one-piece, rigid louvers are in an open position;

a louver pivoting structure for enabling the pivoting of said at least two one-piece, rigid louvers between the closed position and an open position said louver pivoting structure comprising:

at least one louver control arm hinge pin interconnecting said louver control arm and said respective at least one louver control arm pin-receptacle; and at least one hinge plate pin interconnecting said hinge plate and said respective at least one hinge plate pin-receptacle; and a movable support mechanism for selectively applying force to said louver pivoting structure for pivoting said at least two one-piece, rigid louvers between the closed position and an open position, said movable support mechanism comprising a louver control arm;

said respective one-piece, rigid louvers pivoting about said respective at least one hinge plate pin interconnecting said respective one-piece, rigid louvers and said hinge plate in response to movement of said louver control arm, causing the pivoting of said respective one-piece, rigid louvers from said closed position towards an open position or from an open position towards said closed position.

8. The moisture and dust removing pack according to claim 7 wherein said one-piece, rigid louver body of respective one-piece, rigid louvers further comprises an airfoil tip located at said leading end.

9. A moisture and dust removing louver pack for being placed in an air passageway and for removing moisture and dust from airflow flowing through the air passageway, said moisture and dust removing louver pack comprising:

a louver support structure comprising a hinge plate for supporting louvers for pivotal movement in the air passageway;

a set of louvers supported in said louver support structure in the air passageway for pivotal movement between a closed position for closing and sealing the air passageway to obstruct the flow of air through the air passageway and an open position for allowing the flow of air through the air passageway, said set of louvers including at least two one-piece, rigid louvers, said at least two one-piece, rigid louvers each comprising:

a one-piece, rigid louver body having an airfoil configuration enabling airflow across said at least two one-piece, rigid louvers as a generally laminar flow when said set of louvers is in an open position, said airfoil configuration being generally smooth enough to transfer air passing over said airfoil configuration as laminar flow, wherein said body of respective louvers comprises:

a leading end;

an airfoil tip at said leading end, said airfoil tip is a symmetrical airfoil tip comprising:
  a curved upper surface;
  a curved lower surface; and
  a curved leading edge operatively connecting said curved upper surface and said curved lower surface;
  said symmetrical airfoil tip having a cross-sectional configuration wherein said curved upper surface is positioned as a mirror image of said curved lower surface about a straight imaginary line defined by a locus of points midway between said curved upper surface and said curved lower surface;

a trailing end;

a convex surface and an opposing concave surface extending respectively from a place approximate said leading end and said trailing end;

an intermediate portion between said leading end and said trailing end;

said convex surface has a convex leading surface extending between said leading end and said intermediate portion and a convex trailing surface extending between said intermediate portion and said trailing end, said concave surface has a concave leading surface extending between said leading end and said intermediate portion and a concave trailing surface extending between said intermediate portion and said trailing end;

at least one fulcrum location located at said intermediate portion; and at least one pivoting location located proximate said leading end for receiving a force to effect the pivoting of each of said respective one-piece, rigid louvers between the closed position and a range of open positions about one of said at least one fulcrum location;

at least one louver control arm pin-receptacle at said respective at least one pivoting location; and at least one hinge plate pin-receptacle at said respective at least one fulcrum location;

a convex surface extending between said leading end and said trailing end, said convex surface having a convex leading surface extending between said leading end and said intermediate portion and a convex trailing surface extending between said intermediate portion and said trailing end;

a concave surface extending between said leading end and said trailing end, said concave surface having a concave leading surface extending between said leading end and said intermediate portion and a concave trailing surface extending between said intermediate portion and said trailing end; and a symmetrical airfoil tip located at said leading end, said symmetrical airfoil tip comprising a curved upper surface, a curved lower surface, and a curved leading edge operatively connecting said curved upper surface and said curved lower surface, said symmetrical airfoil tip having a cross-sectional configuration wherein said curved upper surface is positioned as a mirror image of said curved lower surface about a straight imaginary line defined by a locus of points midway between said curved upper surface and said curved lower surface;

a moisture and dust removing structure for removing moisture and dust from air flowing past each of said respective one-piece, rigid louvers, said moisture and dust removing structure comprising a protrusion extending from said airfoil configuration, said protrusion being a continuation of the airfoil configuration of said one-piece, rigid louver body and comprising a moisture-separation hook having a fixed portion integral with said one-piece, rigid louver body on a free end surface defining with said one-piece, rigid louver body, a moisture-collection opening facing said leading end of said respective one-piece, rigid louvers, said moisture-collection opening collecting moisture and dust removed from air passing across said moisture-separation hook when said at least two one-piece, rigid louvers are in an open position, wherein said moisture and dust removing structure is located on said concave surface at said intermediate portion, said moisture and dust removing structures of adjacent one-piece, rigid louvers contacting each other in an air-sealing engagement when said set of louvers is in the closed position to seal said lower pack against airflow therethrough;

a louver pivoting structure for enabling the pivoting of said at least two one-piece, rigid louvers between the closed position and a range of open positions said louver pivoting structure comprising:
  at least one louver control arm hinge pin interconnecting said louver control arm and said respective at least one louver control arm pin-receptacle; and
  at least one hinge plate pin interconnecting said hinge plate and said respective at least one hinge plate pin-receptacle; and a movable support mechanism for selectively applying force to said louver pivoting structure for pivoting said at least two one-piece, rigid louvers between the closed position and a range of open positions, said movable support mechanism comprising a louver control arm;

said respective one-piece, rigid louvers pivoting about said respective at least one hinge plate pin interconnecting said respective one-piece, rigid louvers and said hinge plate in response to movement of said louver control arm, causing the pivoting of said respective one-piece, rigid louvers from said closed position towards an open position or from an open position towards said closed position.

* * * * *